US012789566B2

(12) United States Patent
Shetty et al.

(10) Patent No.: US 12,789,566 B2
(45) Date of Patent: Nov. 10, 2026

(54) LEAF SPRING FOR A VEHICLE

(71) Applicant: Volvo Truck Corporation, Gothenburg (SE)

(72) Inventors: Abhinandan Shetty, Udupi (IN); Satheesha Krishna Monthimar, Bangalore (IN); Sindhoor Bhat, Siddapur (IN); Goutam Mandal, West Bengal (IN)

(73) Assignee: Volvo Truck Corporation, Gothenburg (SE)

( * ) Notice: Subject to any disclaimer, the term of this patent is extended or adjusted under 35 U.S.C. 154(b) by 238 days.

(21) Appl. No.: 18/927,014

(22) Filed: Oct. 25, 2024

(65) Prior Publication Data

US 2025/0135821 A1 May 1, 2025

(30) Foreign Application Priority Data

Oct. 31, 2023 (EP) .................................... 23207157

(51) Int. Cl.
*B60G 11/02* (2006.01)
*F16F 1/20* (2006.01)

(52) U.S. Cl.
CPC ................ *B60G 11/02* (2013.01); *F16F 1/20* (2013.01); *B60G 2202/11* (2013.01)

(58) Field of Classification Search
CPC ........ B60G 11/02; B60G 2202/11; F16F 1/18; F16F 1/20
USPC ...... 267/36.1, 37.3, 37.4, 38, 40, 47, 49, 50, 267/52, 260, 262
See application file for complete search history.

(56) References Cited

U.S. PATENT DOCUMENTS

| | | | | |
|---|---|---|---|---|
| 1,256,124 | A | 2/1918 | Gelling | |
| 1,588,434 | A | 6/1926 | Ackerman et al. | |
| 1,859,105 | A * | 5/1932 | Munro ...................... | F16F 1/18 267/47 |

(Continued)

FOREIGN PATENT DOCUMENTS

| | | | |
|---|---|---|---|
| FR | 716692 | A | 12/1931 |
| GB | 241553 | A | 6/1926 |

(Continued)

OTHER PUBLICATIONS

Extended European Search Report for European Patent Application No. 23207157.1, mailed Apr. 24, 2024, 5 pages.

*Primary Examiner* — Christopher P Schwartz
(74) *Attorney, Agent, or Firm* — Withrow & Terranova, PLLC

(57) ABSTRACT

A leaf spring for a vehicle suspension system, the leaf spring comprising a middle leaf plate located between an upper leaf plate and a lower leaf plate and a center bolt extending through an aperture of each of the leaf plates at a central region of the leaf spring, wherein the middle leaf plate has a wavy structure in the longitudinal direction where troughs and crests of waves of the wavy structure form longitudinally distributed contact points for transfer of load between the middle leaf plate and the upper and lower leaf plates, wherein the center bolt aperture of the middle leaf plate has an elongation in the longitudinal direction that is greater than that of the center bolt aperture of the upper and lower leaf plates so as to allow the middle leaf plate to move in the longitudinal direction relative to the upper and lower leaf plates.

19 Claims, 4 Drawing Sheets

(56) References Cited

U.S. PATENT DOCUMENTS

| | | | | |
|---|---|---|---|---|
| 2,585,367 | A | 2/1952 | Brooks et al. | |
| 3,456,939 | A | 7/1969 | Duchemin | |
| 4,412,690 | A * | 11/1983 | Prokop ................ | B60G 11/107 280/686 |
| 8,540,224 | B2 | 9/2013 | Guthrie | |
| 2012/0125699 | A1 | 5/2012 | Guthrie | |

FOREIGN PATENT DOCUMENTS

| | | | |
|---|---|---|---|
| JP | S62127534 | A | 6/1987 |
| WO | 2020147937 | A1 | 7/2020 |

* cited by examiner

LEAF SPRING FOR A VEHICLE

PRIORITY APPLICATIONS

The present application claims priority to European Patent Application No. 23207157.1, filed on Oct. 31, 2023, and entitled "LEAF SPRING FOR A VEHICLE," which is incorporated herein by reference in its entirety.

TECHNICAL FIELD

The disclosure relates generally to a leaf spring for a vehicle suspension system. The disclosure can be applied to heavy-duty vehicles, such as trucks, buses, and construction equipment, among other vehicle types, such as vehicles used in mining applications. Although the disclosure may be described with respect to a particular vehicle, the disclosure is not restricted to any particular vehicle.

BACKGROUND

Leaf springs are commonly used in suspension systems for heavy vehicles, such as trucks, mining dumpers and similar. The vehicle suspension system connects wheels/axles with a chassis/body of the vehicle and typically includes springs, shock absorbers and linkages of various types.

A leaf spring often comprises a plurality of elongated and slightly bent leaf plates stacked on top of and extending along each other in a longitudinal direction of the leaf spring. To hold the package of leaf plates together, a center bolt is typically arranged through an aperture of each of the leaf plates at a central region of the leaf spring, and multiple clips may be arranged to hold the spring plates in place laterally.

The two ends of a leaf spring usually are formed into round eyes or eyelets, through which a fastener connects each end of the spring to the vehicle frame or body. One eye is usually fixed translationally but allowed to pivot with the motion of the spring, whereas the other eye is fastened to a hinge mechanism that allows that end to pivot as well as undergo limited translational movement. A leaf spring may be attached directly to the frame at one end, usually the front, with the other end attached through a shackle, a short swinging arm. The shackle takes up the tendency of the leaf spring to elongate when compressed and thus makes the suspension softer. The shackle provides some degree of flexibility to the leaf spring so that it does not fail when subjected to heavy loads. The wheel axle is usually fastened to the central region of the spring by U-bolts.

Although leaf springs have been used for a long time there is a general need for improvements, such as increasing the ride comfort for vehicle occupants and increased durability.

SUMMARY

According to a first aspect of the disclosure, it relates to a leaf spring for a vehicle suspension system, the leaf spring comprising: a plurality of elongated leaf plates extending along each other in a longitudinal direction of the leaf spring; and a connection arrangement for holding the plurality of leaf plates together, wherein the connection arrangement comprises a center bolt extending through an aperture of each of the leaf plates at a central region of the leaf spring, wherein the plurality of leaf plates comprises a middle leaf plate located between an upper leaf plate and a lower leaf plate, wherein the middle leaf plate has a wavy structure in the longitudinal direction where troughs and crests of waves of the wavy structure form longitudinally distributed contact points for transfer of load between the middle leaf plate and the upper and lower leaf plates, wherein the center bolt aperture of the middle leaf plate has an elongation in the longitudinal direction that is greater than that of the center bolt aperture of the upper and lower leaf plates so as to allow the middle leaf plate to move in the longitudinal direction relative to the upper and lower leaf plates, wherein the middle leaf plate is slidably arranged relative to the upper and lower leaf plates in the longitudinal direction such that when a load is transferred between the middle leaf plate and the upper or lower leaf plate via one or more of the contact points and the waves of the middle leaf plate thereby are stretched, the middle leaf is allowed to i) expand in the longitudinal direction as a result of the stretching of the waves as well as to ii) slide as a whole along and relative to the upper and lower leaf plates in the longitudinal direction.

The leaf spring is preferably connected to a left or right side of a vehicle with its end parts connected to the chassis and with a transversal wheel axle connected to the central region of the leaf spring beneath the lower leaf plate. When arranged this way, an upwardly directed road load transferred from the wheel axle to the leaf spring will move the central region of the leaf spring upwards and, as a result, the lower leaf plate will bend upwards. The load is further transferred to the wavy middle leaf plate via the contact points, which leads to a compression of the wavy middle leaf plate and thus a partial flattening/stretching of the waves that in turn leads to an increase in length of the middle leaf spring. The compression of the wavy leaf plate provides for an enhanced damping effect of the leaf spring. Depending on the particular design of the leaf spring and the magnitude of the load, a significant portion of the load may be transferred further to the upper leaf plate.

Due to the shape of the center bolt aperture of the middle leaf plate, i.e. a longitudinally elongated aperture that allows for relative movement (in contrast to a conventional leaf spring where circular apertures in all leaf plates lock them longitudinally to each other when the center bolt is inserted), and due to the slidable arrangement of the middle leaf plate that allows for relative movement in the longitudinal direction, the middle leaf plate is allowed to slide longitudinally towards either of the end parts of the leaf spring when compressed, i.e. towards either the front or the rear of the vehicle. This is of particular importance in situations where the road load is asymmetric and differs between the front and rear end parts of the leaf spring, such as during braking of the vehicle or when the vehicle is located on a slope. When the load is significantly asymmetric, the middle leaf plate of the present disclosure will slide in the direction where the resistance is less, i.e. in the direction where the load is smaller, and assume a position that is some distance away from a nominal, longitudinally centered position. This longitudinal repositioning of the middle leaf plate improves load distribution within the leaf spring and reduces stress concentration, which in turn increases durability of the leaf spring. It also provides reduction in vertical movement of the leaf spring and in the amount of load transferred to the frame or chassis of the vehicle, which in turn reduces risk of damage to the frame. Frame cracks and leaf spring breakage is in particular associated with vehicles used in mining applications, and the leaf spring of this disclosure is particularly useful for mining vehicles.

The slidable arrangement may be achieved by allowing for the middle leaf plate to slide back and forth in the longitudinal direction and by making sure the leaf plates are not connected to each other in a too tight manner that would result in a too high friction for allowing sliding. To reduce slide friction, the leaf spring may be provided with roller bearings or other friction reducing means arranged between the middle leaf plate and adjacent leaf plates at points where the leaf plates are in contact, such as at the end portions of the middle leaf plate between the middle leaf plate and one or both of the upper and lower leaf plates. Shim plates may be arranged between the middle leaf plate and adjacent leaf plates at the center bolt to control the distance between the leaf plates at the central region and to facilitate relative sliding of the middle leaf plate.

Regardless of whether roller bearings or other friction reducing means are used, the leaf spring may be provided with a guiding arrangement configured to guide the relative movement in the longitudinal direction and prevent relative sliding in a transversal direction. The guiding arrangement may comprise first and second guiding members, such as a ridge or other elongated protrusion extending in a longitudinal direction and a longitudinally directed groove adapted to receive and interact with the ridge, where the first guiding members is arranged on the middle leaf plate and the second guiding member is arranged on an adjacent leaf plate facing the first guiding member. For instance, a guiding ridge may be provided on an upper side of the middle leaf plate (and/or on an upper side of the lower leaf plate) and a guiding groove may be provided on a lower side of the upper leaf plate (and/or on a lower side of the middle leaf plate). The leaf spring may be provided with several guiding arrangements. One or more of the guiding arrangements may be combined with the roller bearings or other friction reducing means. For instance, a guiding ridge may be provided with one or more roller bearings.

In some embodiments, the leaf spring is provided with a slide friction reducer arranged between the middle leaf plate and an adjacent leaf plate.

In some embodiments, the slide friction reducer comprises roller bearings.

In some embodiments, the leaf spring comprises a guiding arrangement configured to guide the relative movement of the middle leaf plate in the longitudinal direction.

In some embodiments, the guiding arrangement comprises first and second interactive guiding members, wherein the first guiding members is arranged on the middle leaf plate and the second guiding member is arranged on an adjacent leaf plate facing the first guiding member.

In some embodiments, one of the first and second interactive guiding members is a ridge or other elongated protrusion extending in a longitudinal direction, wherein the other of the first and second interactive guiding members is a longitudinally directed groove adapted to receive the ridge.

In some embodiments, the guiding arrangement is provided with slide friction reducer so as to form a combined guiding and friction reducing structure.

In some embodiments, the ridge or other elongated protrusion is provided with roller bearings so as to form a combined guiding and friction reducing structure.

In some embodiments, each of the waves of the wavy structure has a shape such that compression of the middle leaf plate between the upper and lower leaf plates leads to stretching and at least partly flattening of the wave. That is, there are no extreme waves/bends that would lead to further bending if the middle leaf plate is compressed between two regular leaf plates.

According to a second aspect of the disclosure, it relates to a vehicle comprising: a chassis; a pair of left and right wheels; a wheel axle that extends transversely across the vehicle and that is connected at the end portions thereof to the left and right wheels; at least one left or right leaf spring connected to the wheel axle in association with a corresponding wheel, wherein the at least one leaf spring is connected also to the chassis so as to, while deflecting, allow relative vertical movement between the chassis and the wheel axle and thereby also to the corresponding wheel, wherein the at least one leaf spring is arranged according to above.

In some embodiments, the at least one leaf spring has an elongated shape and extends in a direction substantially in parallel with a longitudinal roll axis of the vehicle.

In some embodiments, the at least one leaf spring is connected to the chassis at a first point in front of the corresponding wheel and at a second point behind the corresponding wheel with reference to a front and rear of the vehicle. In some embodiments, the at least one leaf spring is connected to the second point of the chassis via a pivoted shackle.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
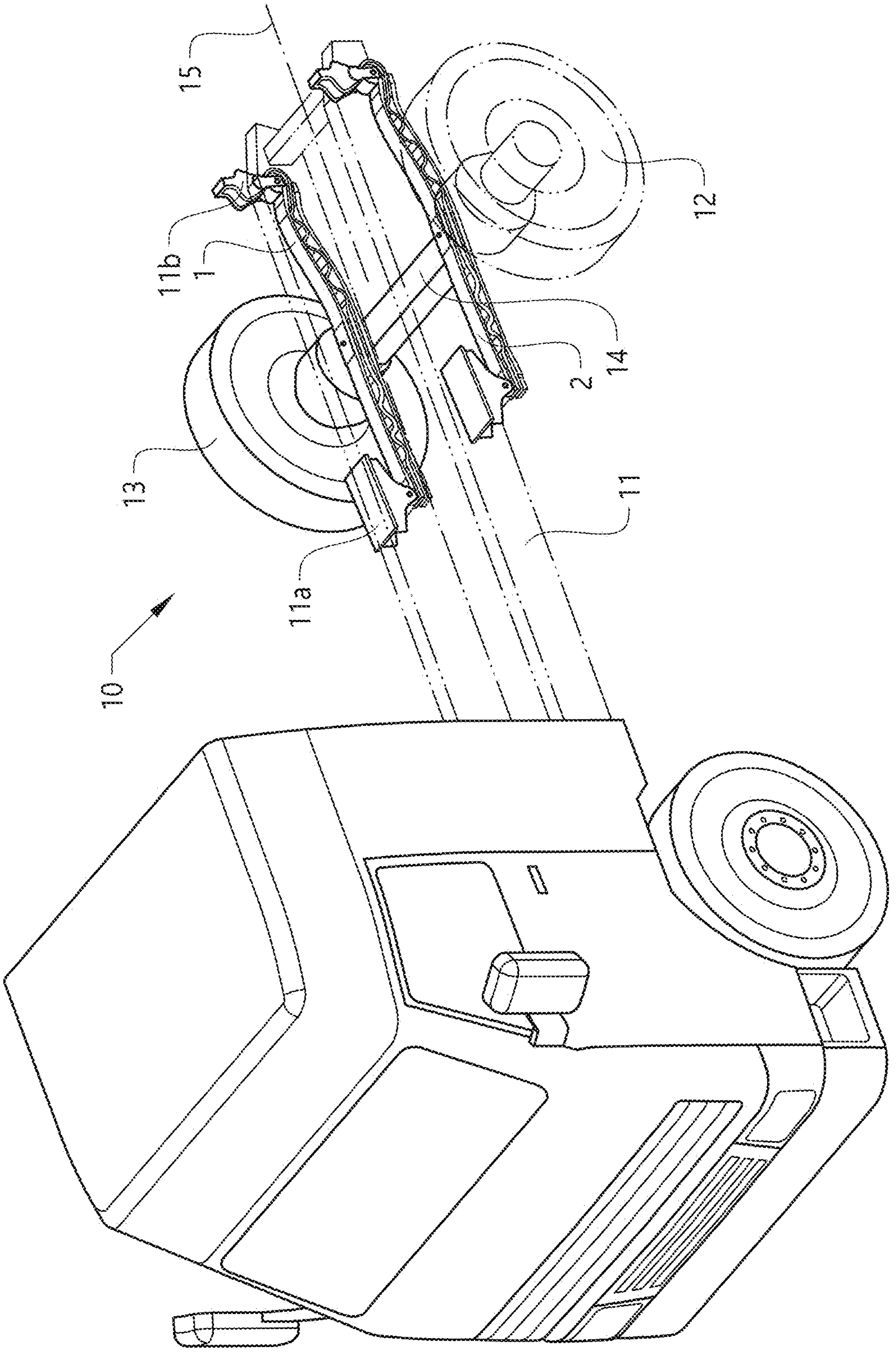
FIG. 1 shows an example of a vehicle in the form of a truck provided with an example of a pair of leaf springs according to this disclosure.

The exemplified vehicle 10 of FIG. 1 comprises a chassis 11, a pair of left and right wheels 12, 13, a wheel axle 14 that extends transversely across the vehicle 10 and that is connected at the end portions thereof to the left and right wheels 12, 13. As part of a vehicle suspension system, the vehicle further comprises a pair of left and right leaf springs 1, 2 (which in this example are in principle identical) connected to the wheel axle 14 in association with the corresponding wheel 12, 13. The suspension system may further comprise e.g. separate shock absorbers (not shown).

Each leaf spring 1, 2 is connected also to the chassis 11 so as to, while deflecting, allow relative vertical movement between the chassis 11 and the wheel axle 14 and thereby also between the chassis 11 and the wheels 12, 13. Each leaf spring 1, 2 has an elongated shape and extends in a direction substantially in parallel with a longitudinal roll axis 15 of the vehicle 10.

Each leaf spring 1, 2 is connected to the chassis 11 at a first point 11*a* in front of the corresponding wheel 12, 13 and at a second point 11*b* behind the corresponding wheel 12, 13 with reference to a front and rear of the vehicle 10. Further, each leaf spring 1, 2 is connected to the second point 11*b* of the chassis via a pivoted shackle 16 (see FIG. 2).

As shown in FIGS. 2-5, each leaf spring 1, 2 comprises a plurality of elongated leaf plates 3, 4, 5 extending along each other in a longitudinal direction of the leaf spring 1, 2 and a connection arrangement for holding the plurality of leaf plates 3, 4, 5 together. The connection arrangement comprises a center bolt 6 extending through an aperture 8*a*, 8*b*, 8*c* of each of the leaf plates 3, 4, 5 at a central region 9 of the leaf spring 1, 2. The connection arrangement also comprises a nut 7 screwed onto the center bolt 6 and a plurality of clips (not shown) arranged to hold the leaf plates (3, 4, 5) in place laterally.

Figure 2:
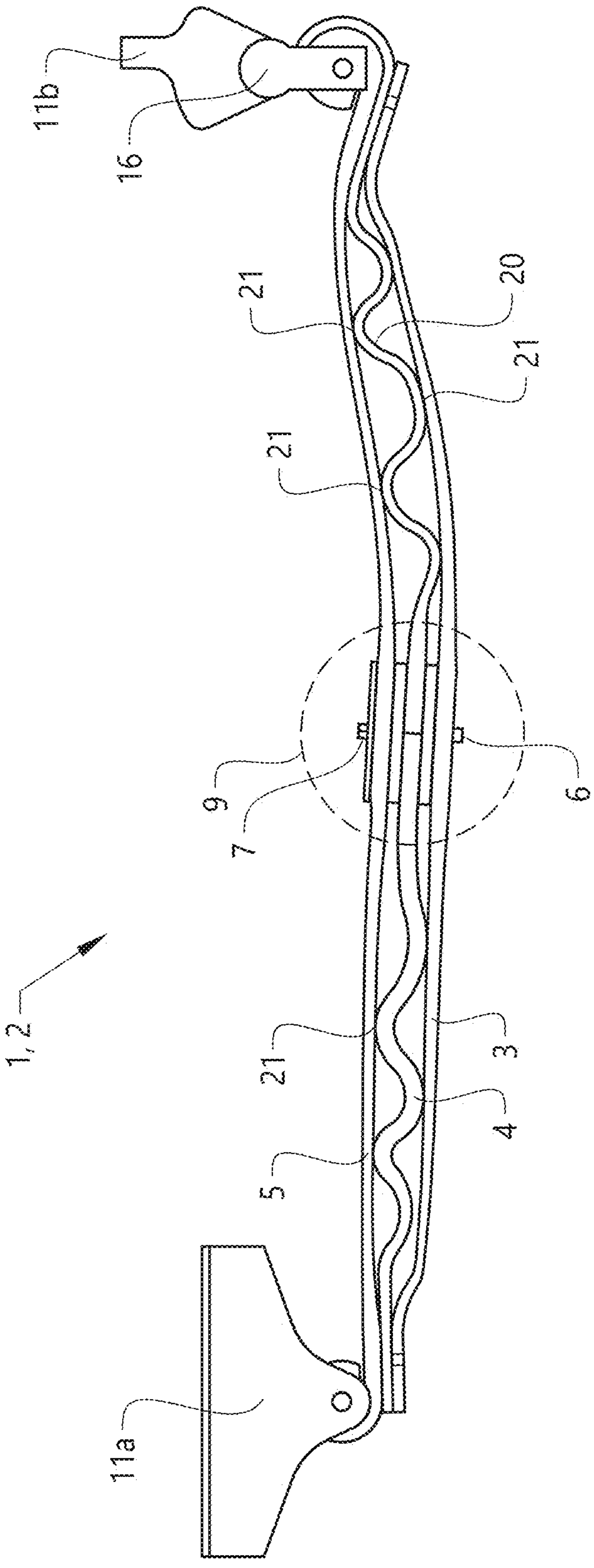
FIG. 2 shows one of the leaf springs of FIG. 1.

As shown in e.g. FIG. 2, the plurality of leaf plates comprises a middle leaf plate 4 located between and adjacent to an upper leaf plate 5 and a lower leaf plate 3, where "upper" and "lower" refers to the relative position when the leaf spring 1, 2 is mounted in a typical orientation onto a vehicle. A bent end part of the upper leaf plate 5 forms an eye 25 for connection to the chassis 11. A bent end part of the middle leaf plate 4 forms in this example a part of the eye 25.

The middle leaf plate 4 has a wavy structure in the longitudinal direction where troughs and crests of waves 20 of the wavy structure form longitudinally distributed contact points 21 for transfer of load between the middle leaf plate 4 and the upper and lower leaf plates 3, 5.

Figure 3A:
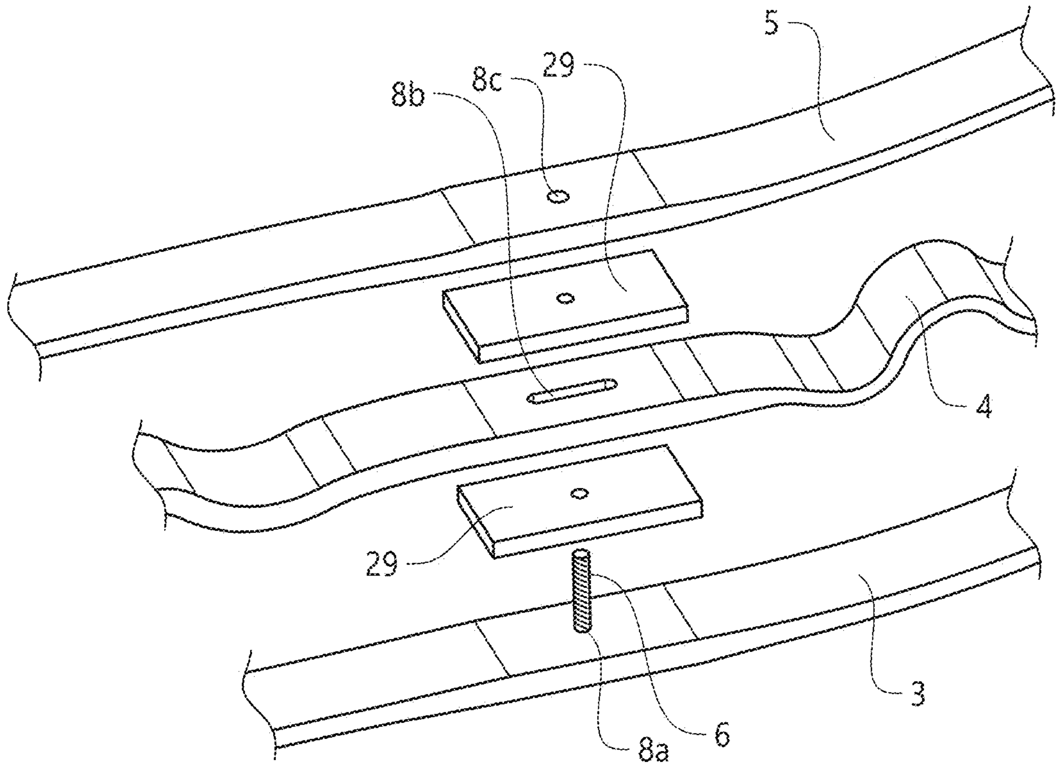
FIGS. 3A and 3B show a central region of the leaf spring of FIG. 2 in an exploded view (FIG. 3A) and when put together (FIG. 3B).
Figure 3B:
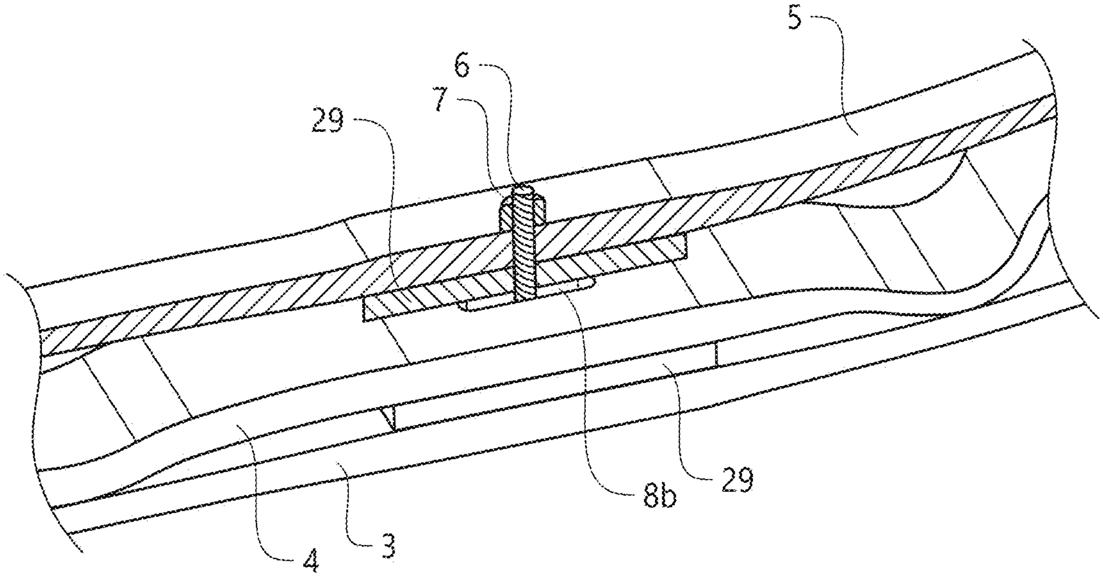

As shown in FIGS. 3A and 3B, the center bolt aperture 8*b* of the middle leaf plate 4 has an elongation in the longitudinal direction that is greater than that of the circular center bolt aperture 8*a*, 8*c* of the upper and lower leaf plates 3, 5 so as to allow the middle leaf plate 4 to move in the longitudinal direction relative to the upper and lower leaf plates 3, 5. Shim plates 29 are arranged between the leaf plates 3, 4, 5 at the center bolt 6.

The middle leaf plate 4 is slidably arranged relative to the upper and lower leaf plates 3, 5 in the longitudinal direction such that when a wheel 12, 13 hits a bump when the vehicle 10 moves and a load is transferred from the lower leaf plate 3 to the middle leaf plate 4 via one or more of the contact points 21 and the waves 20 of the middle leaf plate 4 thereby are stretched, the middle leaf 4 is allowed to i) expand in the longitudinal direction as a result of the stretching of the waves 20 as well as to ii) slide as a whole along and relative to the upper and lower leaf plates 3, 5 in the longitudinal direction. The latter is of primary importance in case the load is asymmetric, such as when the vehicle 10 brakes or is located in a steep slope. As mentioned already further above, this longitudinal repositioning of the middle leaf plate 4 improves load distribution within the leaf spring 1, 2 and reduces stress concentration, which in turn increases durability of the leaf spring 1, 2. It also provides reduction in vertical movement of the leaf spring 1, 2 and in the amount of load transferred to the chassis 11 of the vehicle 10, which in turn reduces risk of damage to the chassis 11.

Figure 4:
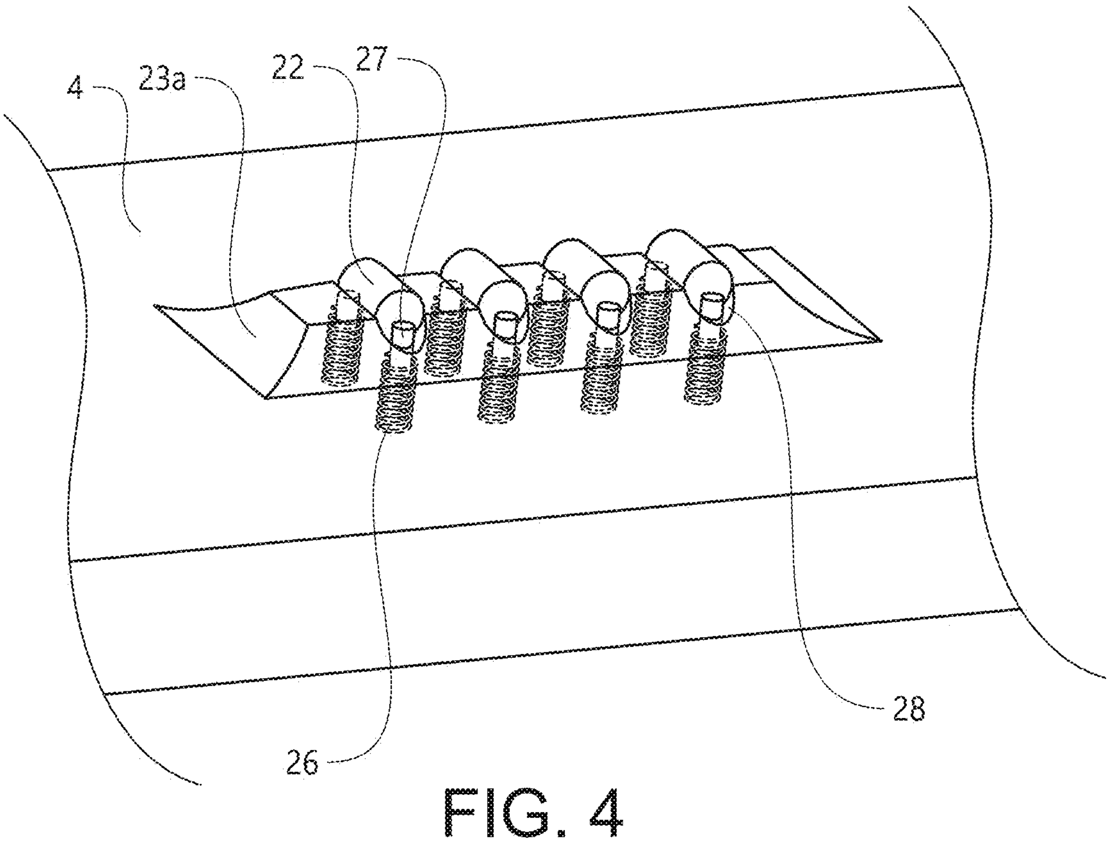
FIG. 4 shows a part of an example of a combined guiding and friction reducing arrangement.
Figure 5:
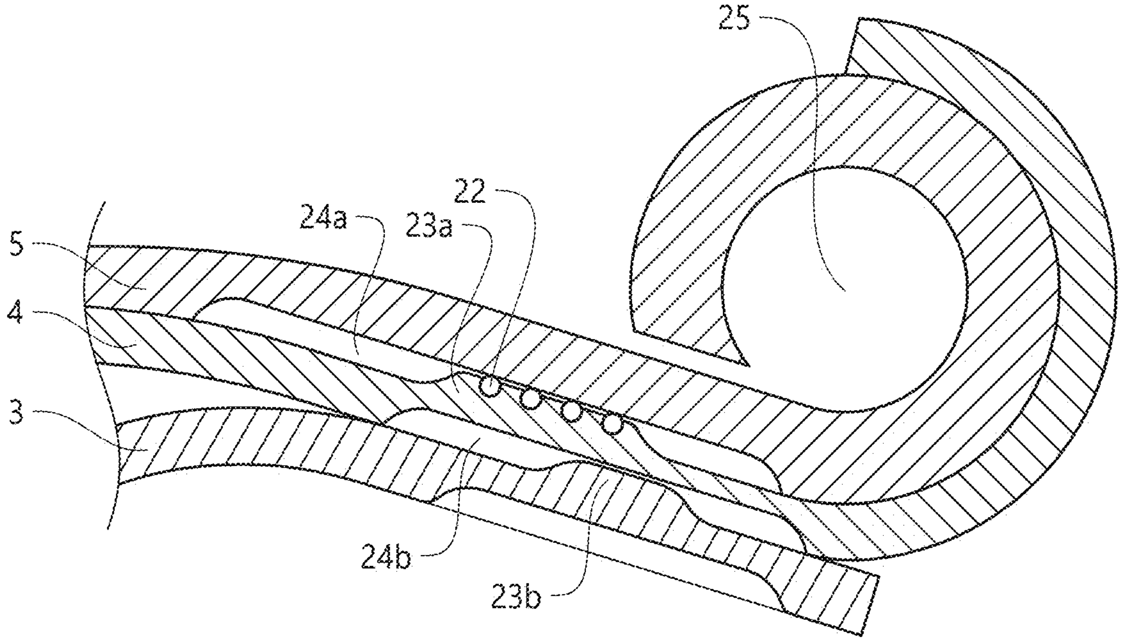
FIG. 5 shows, in a sectional view, an example of a leaf spring provided with an arrangement according to FIG. 4.

As shown in FIGS. 4-5, the leaf spring 1, 2 is provided with a slide friction reducer in the form of roller bearings 22 in this example arranged on an upper side of the middle leaf plate 4 so as to be located between the middle leaf plate 4 and a lower side of the adjacent upper leaf plate 5. The roller bearings 22 reduces the friction and facilitates relative sliding of the middle leaf plate 4.

Cylindrical roller bearings 22 are placed sideways into cutouts 28 provided in a ridge 23*a* as shown in FIG. 4. An upper with of the cutouts 28 is smaller than the diameter of the roller bearings 22 so as to keep the roller bearings 22 in place vertically. Pins 27 placed on coil springs 26 keep the roller bearings 22 in place in the lateral direction of the middle leaf spring 4 (i.e. in the longitudinal direction of the roller bearings 22). The pins 27 are pressed down to insert the roller bearings 22. The pins 27 are placed in holes (not shown) in the middle leaf plate 4.

The leaf spring 1, 2 further comprises a guiding arrangement 23, 24 configured to guide the relative sliding movement of the middle leaf plate 4 in the longitudinal direction. In this example the guiding arrangement comprises first and second interactive guiding members in the form of a ridge 23 extending in the longitudinal direction and a groove 24 adapted to receive the ridge 23. As shown in FIG. 5, one ridge 23*b* is formed on the upper side of the lower leaf plate 3 with a corresponding groove 24*b* provided on the lower side of the middle leaf plate 4, and another ridge 23*a* is formed on the upper side of the middle leaf plate 4 with a corresponding groove 24*a* provided on the lower side of the upper leaf plate 5. When the middle leaf plate 4 slides/moves in relation to the upper and lower leaf plates 3, 5, the ridges 23*a*, 23*b* are guided by their corresponding groove 24*a*, 24*b* so as to keep the leaf plates 3, 4, 5 aligned in the longitudinal direction.

As further shown in FIGS. 4 and 5, the roller bearings 22 are in this example arranged in the ridge 23*a* that also forms part of the guiding arrangement. The leaf spring 1, 2 shown in the figures is thus provided with a combined guiding and friction reducing structure.

As to the waves 20 of the wavy middle leaf plate 4, their exact shape and number can be adapted depending on the particular dimension, design and intended use of the leaf spring 1, 2. Also the stiffness of the middle leaf plate 4 may be varied. In this case there are around three contact points 21 at each of the adjacent leaf plates 3, 5, at each side of the central region 9. Along the central region 9 the middle leaf plate may be substantially flat. As shown in FIG. 2, each of the waves 20 has a shape such that compression of the middle leaf plate 4 between the upper and lower leaf plates 3, 5 leads to stretching and at least partly flattening of the wave 20. This means there no extreme bends/waves where the middle leaf plate 4 at some point extends in a direction that is parallel to a normal to the surface of the adjacent leaf plates 3, 5 (i.e. the middle leaf plate never extends in a vertical direction if the surface of adjacent leaf plates is horizontal).

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. A leaf spring for a vehicle suspension system, the leaf spring comprising:

a plurality of elongated leaf plates extending along each other in a longitudinal direction of the leaf spring; and a connection arrangement for holding the plurality of leaf plates together, wherein the connection arrangement comprises a center bolt extending through an aperture of each of the leaf plates at a central region of the leaf spring;

wherein the plurality of leaf plates comprises a middle leaf plate located between an upper leaf plate and a lower leaf plate;

wherein the middle leaf plate has a wavy structure in the longitudinal direction where troughs and crests of waves of the wavy structure form longitudinally distributed contact points for transfer of load between the middle leaf plate and the upper and lower leaf plates;

wherein the center bolt aperture of the middle leaf plate has an elongation in the longitudinal direction that is greater than that of the center bolt aperture of the upper and lower leaf plates so as to allow the middle leaf plate to move in the longitudinal direction relative to the upper and lower leaf plates; and wherein the middle leaf plate is slidably arranged relative to the upper and lower leaf plates in the longitudinal direction such that when a load is transferred between the middle leaf plate and the upper or lower leaf plate via one or more of the contact points and the waves of the middle leaf plate thereby are stretched, the middle leaf is allowed to i) expand in the longitudinal direction as a result of the stretching of the waves and to ii) slide as a whole along and relative to the upper and lower leaf plates in the longitudinal direction.

2. The leaf spring of claim 1, wherein the leaf spring comprises a guiding arrangement configured to guide the relative movement of the middle leaf plate in the longitudinal direction.

3. The leaf spring of claim 2, wherein the guiding arrangement comprises first and second interactive guiding members, wherein the first guiding member is arranged on the middle leaf plate and the second guiding member is arranged on an adjacent leaf plate and facing the first guiding member.

4. The leaf spring of claim 3, wherein one of the first and second interactive guiding members is a ridge or other elongated protrusion extending in a longitudinal direction, and wherein the other of the first and second interactive guiding members is a longitudinally directed groove adapted to receive the ridge.

5. The leaf spring of claim 4, wherein the guiding arrangement is provided with a slide friction reducer so as to form a combined guiding and friction reducing structure.

6. The leaf spring of claim 4, wherein the ridge or other elongated protrusion is provided with roller bearings so as to form a combined guiding and friction reducing structure.

7. The leaf spring of claim 3, wherein the guiding arrangement is provided with a slide friction reducer so as to form a combined guiding and friction reducing structure.

8. The leaf spring of claim 3, wherein the ridge or other elongated protrusion is provided with roller bearings so as to form a combined guiding and friction reducing structure.

9. The leaf spring of claim 2, wherein the ridge or other elongated protrusion is provided with roller bearings so as to form a combined guiding and friction reducing structure.

10. The leaf spring of claim 1, wherein the leaf spring is provided with a slide friction reducer arranged between the middle leaf plate and an adjacent leaf plate.

11. The leaf spring of claim 10, wherein the slide friction reducer comprises roller bearings.

12. The leaf spring of claim 11, wherein the guiding arrangement is provided with a slide friction reducer so as to form a combined guiding and friction reducing structure.

13. The leaf spring of claim 11, wherein the ridge or other elongated protrusion is provided with roller bearings so as to form a combined guiding and friction reducing structure.

14. The leaf spring of claim 10, wherein the guiding arrangement is provided with a slide friction reducer so as to form a combined guiding and friction reducing structure.

15. A vehicle comprising:

a chassis;

a pair of left and right wheels;

a wheel axle that extends transversely across the vehicle and that is connected at the end portions thereof to the left and right wheels; and at least one left or right leaf spring connected to the wheel axle in association with a corresponding wheel, wherein the at least one leaf spring of claim 1 is connected also to the chassis so as to, while deflecting, allow relative vertical movement between the chassis and the wheel axle and thereby also between the chassis and the corresponding wheel.

16. The vehicle of claim 15, wherein the at least one leaf spring has an elongated shape and extends in a direction substantially in parallel with a longitudinal roll axis of the vehicle.

17. The vehicle of claim 15, wherein the at least one leaf spring is connected to the chassis at a first point in front of the corresponding wheel and at a second point behind the corresponding wheel with reference to a front and rear of the vehicle.

18. The leaf spring of claim 1, wherein each of the waves of the wavy structure has a shape such that compression of the middle leaf plate between the upper and lower leaf plates leads to stretching and at least partly flattening of the wave.

19. The vehicle of claim 15, wherein the at least one leaf spring is connected to the second point of the chassis via a pivoted shackle.

* * * * *